Oct. 15, 1929.  M. H. MARTIN  1,732,134
BOLSTER WITH SHOCK ABSORPTION MECHANISM
Filed Jan. 25, 1927  7 Sheets-Sheet 1

Oct. 15, 1929.  M. H. MARTIN  1,732,134
BOLSTER WITH SHOCK ABSORPTION MECHANISM
Filed Jan. 25, 1927    7 Sheets-Sheet 3

Oct. 15, 1929.  M. H. MARTIN  1,732,134
BOLSTER WITH SHOCK ABSORPTION MECHANISM
Filed Jan. 25, 1927  7 Sheets-Sheet 5

Oct. 15, 1929.  M. H. MARTIN  1,732,134
BOLSTER WITH SHOCK ABSORPTION MECHANISM
Filed Jan. 25, 1927   7 Sheets-Sheet 7

Fig. 17.

Patented Oct. 15, 1929

1,732,134

UNITED STATES PATENT OFFICE

MARK H. MARTIN, OF BALTIMORE, MARYLAND, ASSIGNOR TO T. H. SYMINGTON & SON, INC., OF BALTIMORE, MARYLAND, A CORPORATION OF MARYLAND

BOLSTER WITH SHOCK-ABSORPTION MECHANISM

Application filed January 25, 1927. Serial No. 163,358.

The invention relates to railway car trucks and has particular reference to the bolster construction.

The principal object of the invention, generally stated, is to provide a railway truck bolster provided with absorption mechanism acting in series with the truck springs for increasing the spring capacity and travel and breaking up synchronization whereby side sway or car roll with its attendant disadvantages will be eliminated.

An important object of the invention is to provide auxiliary spring or cushion mechanism within a bolster acting in series with the usual or any preferred truck springs for increasing the general spring capacity and preventing overloading of the truck springs either under heavy load conditions or as the result of increased pressure caused by tendency of the car to develop a roll or side sway, the invention being equally applicable to trucks of that type in which the load is sustained upon a center bearing or upon side bearings.

Another object of the invention is to provide a truck bolster in which the cushioning mechanism is entirely enclosed so as to be protected from injury by the ingress of dirt or water or any foreign matter.

A further object of the invention is the provision of a truck bolster embodying a cushion mechanism but still capable of being employed as a replacement for ordinary bolsters or those of standard pattern without it being necessary to alter or modify the construction of the side frames or other truck parts to effect installation.

Another object of the invention is to provide a series of laminated spring plates located within the ends of a bolster of standard or special design, said plates to be flexed through the medium of a follower actuated by the reaction from the customary or equivalent truck springs through suitable interposed means, said laminated springs being in series with the truck springs and having an absorption value, the absorption characteristic producing a combined reaction of less magnitude than the actuating force, thus eliminating or reducing one of the factors producing car roll.

Another important object of the invention is to provide auxiliary spring or cushion mechanism within a bolster acting in series with the usual or any preferred truck spring for increasing the general spring travel, thus preventing or reducing the possibility of unloading the wheels on one side of the truck, this feature being of great importance when the car weight is carried on side bearing rockers or rollers instead of the usual center plate. When carried thus the added spring travel is equivalent to the usual side bearing clearances used when the car weight is taken on the generally used center plate.

Another object of the invention is to provide a bolster of this character which in one modification is provided with novel means whereby spring plates constituting the cushioning means may be readily inserted and distributed within the holders therefor.

Yet another object of the invention is to provide a truck bolster equipped internally with a bank or banks of plate or leaf springs adapted to be flexed by the action of a combined seat and follower engaged upon the truck springs, means being provided for holding the follower, and consequently the plate or leaf springs, in assembled relation prior to installation within a truck so that displacement and possible loss of any of the parts during transportation or handling will be avoided.

A still further object of the invention is to provide an auxiliary cushioning mechanism which in another modification cooperates with a follower engaged upon the truck springs and with rollers, rockers or other equivalent elements for permitting lateral motion of the bolster with respect to the truck as has been found of benefit in practice for well recognized reasons.

An additional object of the invention is to provide a structure of this character which will be comparatively simple and inexpensive to manufacture, easy to assemble and install, positive in action, efficient and durable in service, and a general improvement in the art.

With the above and other objects and advantages in view, the invention preferably consists in the arrangement and combination of parts and detailed structural features to be hereinafter more fully described and claimed, and illustrated in the accompanying drawings in which:

Figure 1:
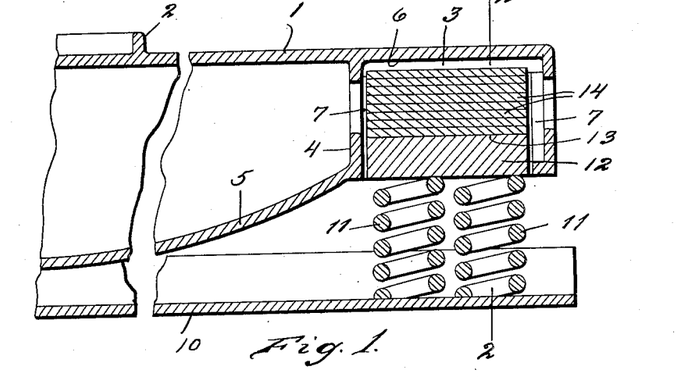
Figure 1 is a vertical longitudinal section through one end portion of a bolster showing the simplest form of the invention applied thereto, the spring plank and truck springs being also illustrated.
Figure 2:
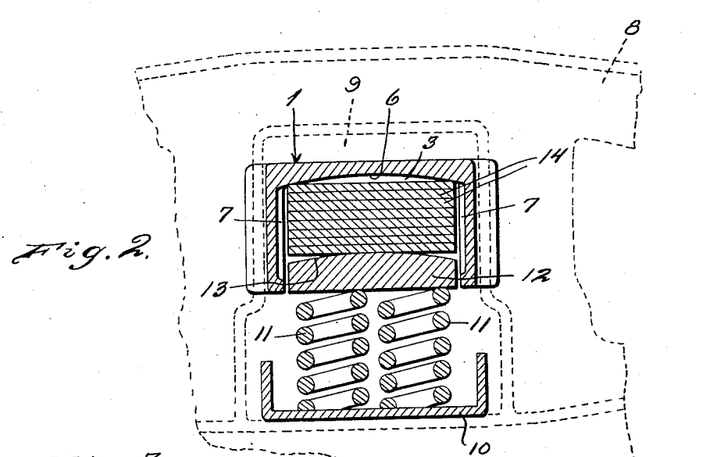
Figure 2 is a vertical cross section taken on substantially the line 2—2 of Figure 1 with the outline of the side frame indicated in dotted lines and with the centering or retaining elements for the springs shown in elevation.
Figure 3:
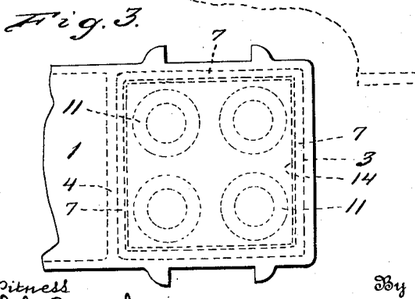
Figure 3 is a top plan view of one end portion of the bolster.
Figure 4:
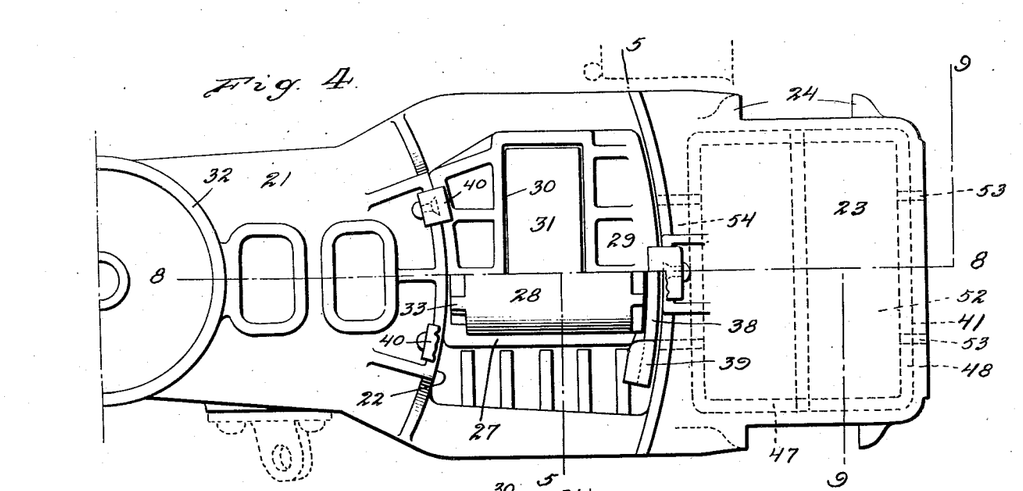
Figure 4 is a top plan view with parts broken away showing a bolster embodying the invention and equipped with side bearings for sustaining the load of the car.
Figure 5:
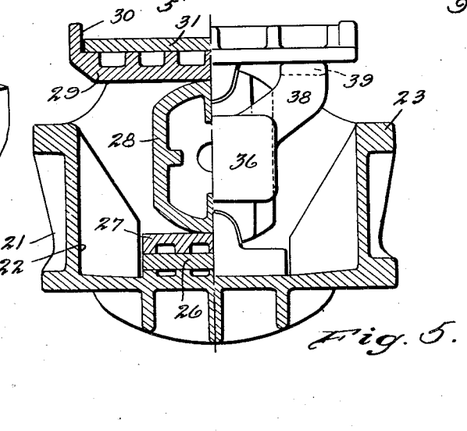
Figure 5 is a vertical cross sectional view taken on substantially the line 5—5 of Figure 4.
Figure 6:
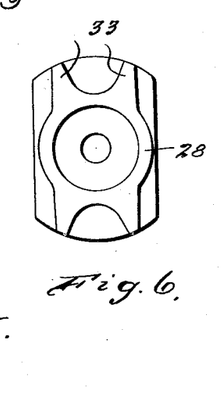
Figure 6 is a detail end elevation of the rocker.
Figure 7:
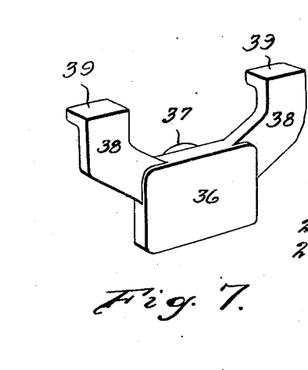
Figure 7 is a detail perspective view of a wear member forming part of the side bearing structure.
Figures 8, 9:
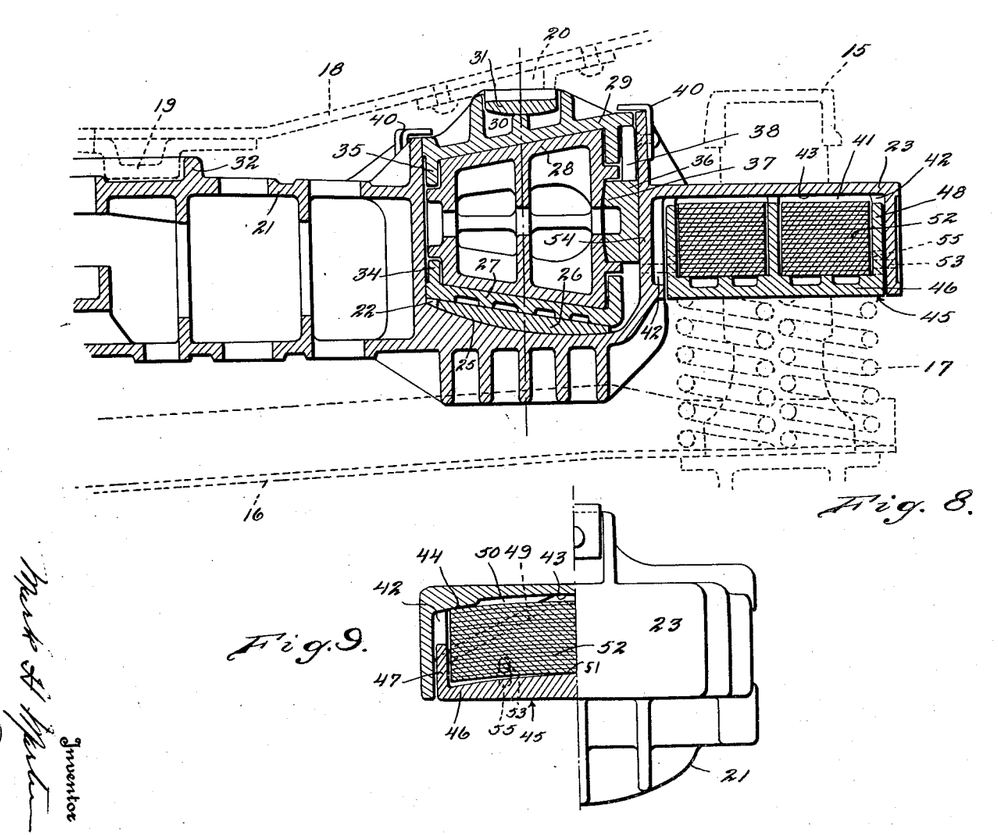
Figure 8 is a vertical longitudinal section taken on substantially the line 8—8 of Figure 4.
Figure 9 is a view of the bolster partly in end elevation and partly in vertical cross section, the view being taken on the line 9—9 of Figure 4.
Figures 10, 11:
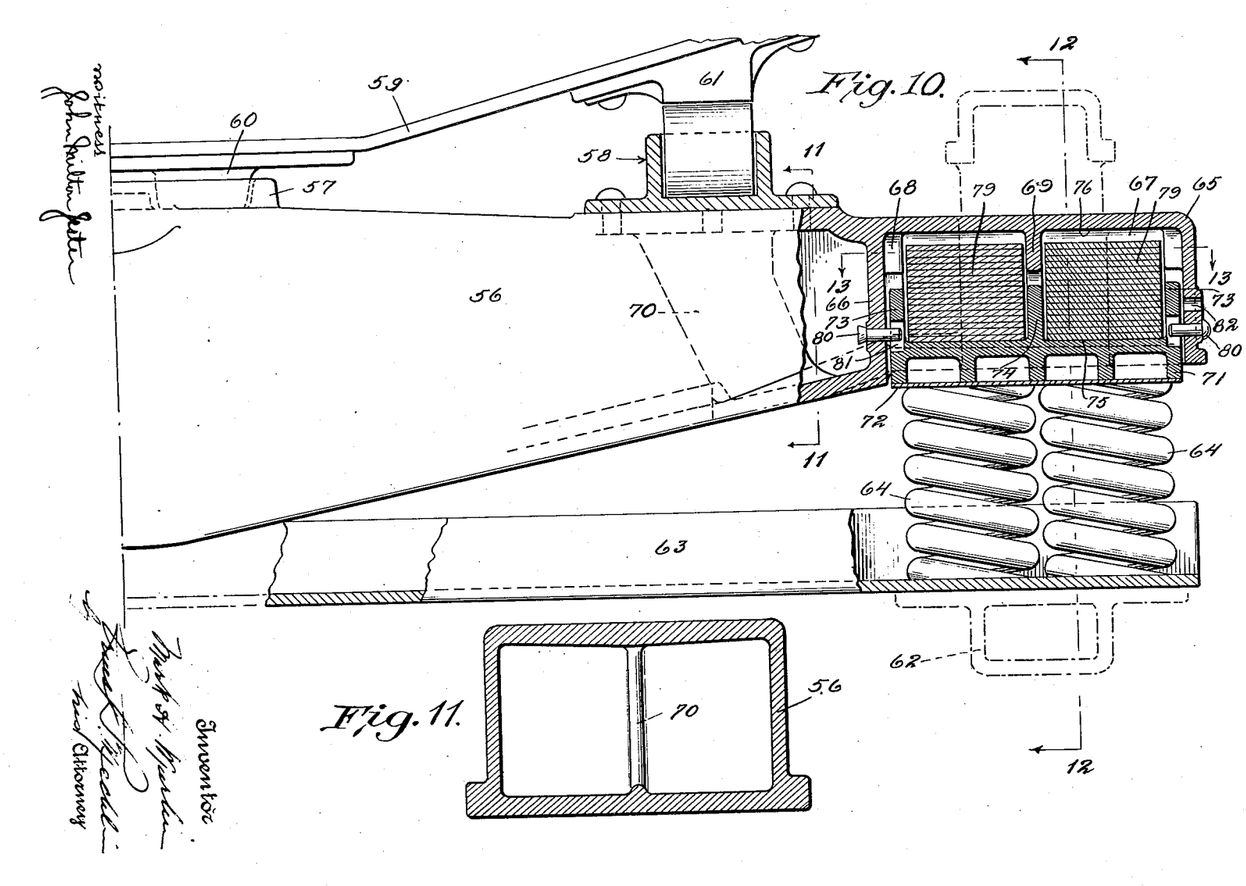
Figure 10 is a view partly in side elevation and partly in vertical longitudinal section showing the invention applied to a bolster of the type in which the load is sustained upon the center bearing with the side bearings used principally as guides and limiting means.
Figure 11 is a detail cross section taken on the line 11—11 of Figure 10.
Figure 12:
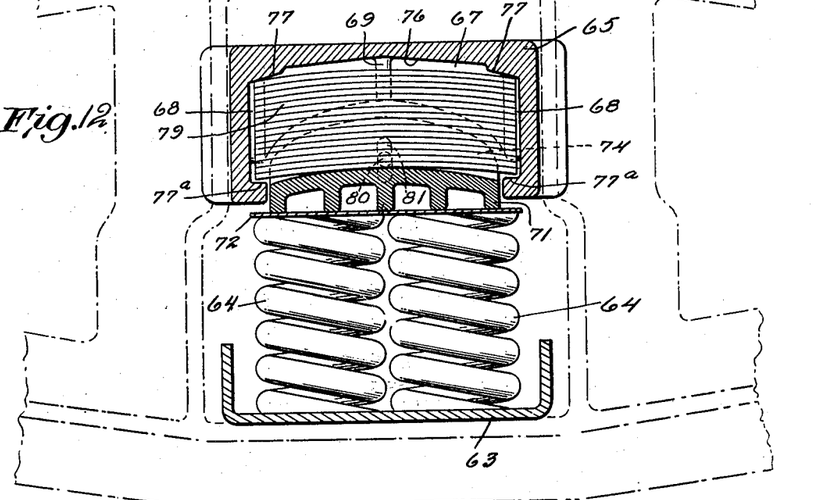
Figure 12 is a vertical cross section through the bolster and spring plank taken on the line 12—12 of Figure 10, the side frame being shown in outline by dot and dash lines.
Figure 13:
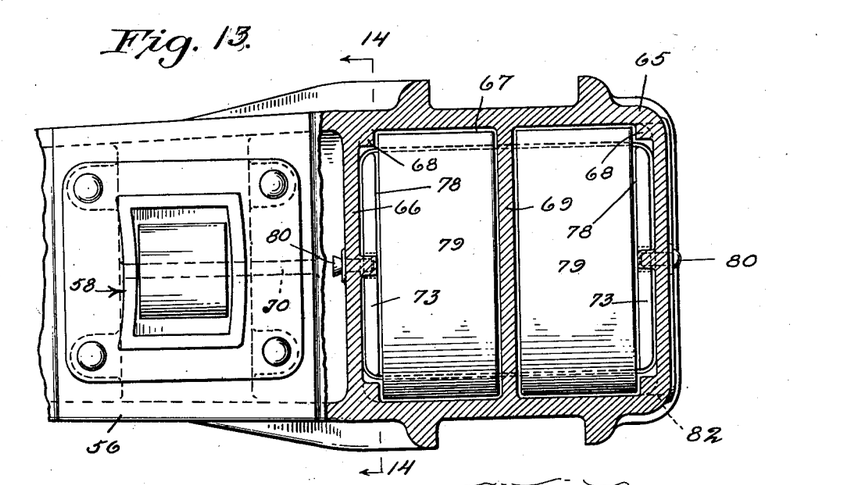
Figure 13 is a view partly in elevation and partly in section on the line 13—13 of Figure 10.
Figure 14:
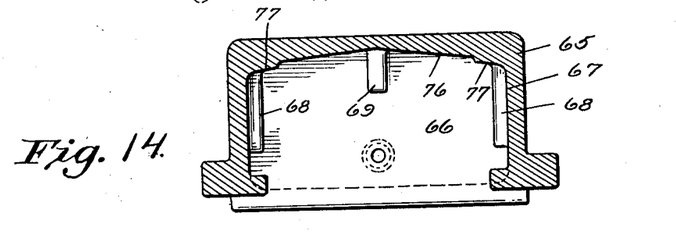
Figure 14 is a vertical cross section taken on the line 14—14 of Figure 13.
Figure 15:
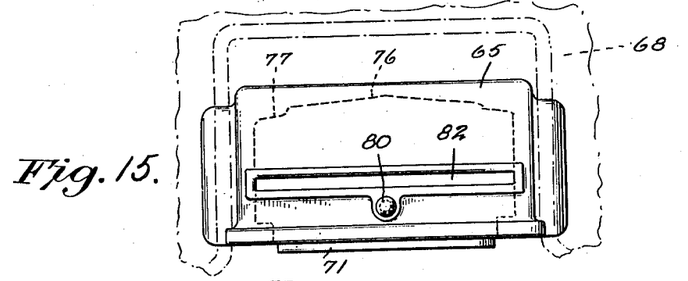
Figure 15 is an end elevation of the bolster, a portion of the side frame being shown by dot and dash lines.

Referring more particularly to the drawings and especially to Figures 1 to 3 inclusive, the numeral 1 designates, generally, a bolster having the usual center bearing 2 and which is, presumably, to be equipped with any ordinary or preferred side bearing not shown as it forms no part of the present invention. In accordance with the carrying out of the present improvement each end of the bolster is formed to provide a pocket 3 which is preferably of generally rectangular outline and which may be defined by a vertically arranged web or partition 4 extending from the top and merging into the bottom 5. In other respects the bolster may be of conventional pattern. The pocket 3 is open at its bottom and has its top surface 6 concaved upwardly as indicated, there being also preferably provided vertically extending ribs 7 at the corners.

The bolster is intended to be used in connection with any ordinary or preferred side frames 8 having window openings 9 at the bottoms of which is supported the spring plank 10 on which are seated the truck springs 11 which, in these three figures, are disclosed rather diagrammatically in that they are not caged or formed into a nest.

Mounted within the open bottom of the pocket 3 and arranged for vertical movement therein is a combined spring seat and follower 12 which rests upon the springs and which has a convex upper surface 13 corresponding, preferably, to the curvature of the concaved wall 6. The cushioning means is here disclosed as comprising a bank or plurality of plate or leaf springs 14 located between the combined seat and follower 12 and the concaved wall 6 of the pocket, the ends of the uppermost plate or leaf engaging against this concaved wall or surface near the ends thereof, and the bottom leaf or plate having its central portion contacting with the central portion of the convex surface 13. Only one group or bank of springs is disclosed in this instance but it should be distinctly understood that a greater number may be used if found desirable for any purpose whatsoever.

In Figures 4 to 9 inclusive, I have illustrated the invention as embodied in a bolster of that type in which the load is sustained by side bearings, there being clearance at the center bearing. Referring to these figures in detail, the numeral 15 designates a portion of the side frame, 16 represents the spring plank, 17 the springs or nest of springs at each end of the spring plank, and 18 the body bolster having a center plate 19 and side bearing element 20 thereon. These parts are old and well known and no novelty is claimed for them.

The bolster is in this instance represented by the numeral 21 and may, in most respects, be of the same general construction as others of its class. However, the bolster is provided with an enlarged pocket portion 22 beyond which is an extension 23, the structure being identical at both ends. The extensions 23 are intended to be located in the window openings of the side frames and are formed with guide portions 24 cooperating with the column guides. The specific construction of the various wall elements defining the pocket 22 may of course be varied though the details may be conveniently substantially the same as disclosed herein. No claim is made in this application to any novelty in this particular part of the bolster. The bottom of the pocket 22 is shown as having a curved surface 25 on which is seated an equalizing block or plate 26 having a correspondingly curved surface and constituting a support for a wear plate 27 on which rolls a frusto-conical rocker 28 in turn supporting a bearing plate 29 having a socket 30 therein within which is mounted an equalizing block 31 engaged by the side bearing element 20 depending from the body bolster 18. In view of the fact that clearance is provided between the center plate 19 and the center bearing 32 on the bolster it is clear that the load is sustained by the side bearings, the weight coming upon the rockers 28. These rockers are represented as having teeth 33 coacting with upstanding teeth 34 on the wear plate 27 and depending teeth 35 on the bearing plate 29 for centralizing the parts and insuring proper rolling movement of the rollers instead of permitting them to have a mere sliding action. The purpose of the equalizing blocks 26 and 31 is to permit the parts to accommodate themselves properly and insure flat engagement of the coacting surfaces notwithstanding any manufacturing variations there may be in the parts themselves. The numeral 36 designates an end thrust take-up member which bears against the outer wall forming the pocket and this member has an extending portion 37 fitting within the outer end of the roller and carries divergent arms 38 terminating in lateral extensions 39 bearing against the underside of the bearing plate 29. The parts of the side bearing structure are represented as held against displacement or separation during transportation or handling by means of clips 40 carried by the opposite end walls of the pocket and overhanging the bearing member 29. The above described details as to the side bearing structure are not essential but the description and illustration are given to indicate clearly the application of the invention to a bolster of the type in which the load is sustained upon side bearings.

The extension or end portion 23 at each end of the bolster is formed to provide a pocket 41 which has an open bottom and which is adapted to contain the auxiliary spring mechanism. This pocket is preferably provided at its corners with vertical guide ribs 42 and its top is of general upwardly concaved shape as shown at 43 and being formed with ledges 44 adjacent the side walls. Located within each of these pockets is a combined spring seat and follower 45 adapted to seat upon the truck springs 17 and provided with any suitable means, not shown, for preventing relative displacement. This combined follower and guide includes a bottom portion 46 from which rise flanges 47 and 48 slidably mounted within the pocket in cooperative relation to the guide ribs 42, the flanges 48 being preferably cut away at an angle as indicated at 49 as are depending webs 50 in the pocket, this arrangement being provided to strengthen the structure and to permit the necessary vertical movement of the member 45 without hindrance. The top surface 51 of the bottom 46 of the combined spring seat and follower is convexed and engaged thereon are one or more groups or banks of plate or leaf springs 52, the center of the lowermost leaf or plate of which engages upon the convex surface 51 and the ends of the uppermost leaf or plate of which bear against the ledges 44. This arrangement is provided to insure flexing of the springs under load conditions.

In order that the member 45 and the spring plates or leaves may be maitained in assembled relation to the bolster during transportation or other handling, use may be made of pins or other equivalent securing elements 53 which pass though the end of the bolster and through the partition wall 54 at the inner end of the pocket 41 and which engage within slots 55 in the flanges 48. The bottom 46 of the combined spring seat and follower is not necessarily solid as Figure 8 discloses a ridged construction. Furthermore there is no restriction as to the employment of two groups or banks of springs though such are disclosed but it is apparent that any number of spring pockets may be provided within the spirit of the invention.

In Figures 10 to 15 inclusive I have shown the invention applied to a bolster of the type in which the load is sustained upon center bearings, side bearings being provided more as guides as is understood in the art. In this form of the invention the numeral 56 designates a bolster having the usual center bearing 57 and carrying a side bearing 58. The numeral 59 designates a body bolster which has the usual center bearing 60 cooperating with the center bearing 57 and which has a side bearing 61 cooperating with the side bearing 58. A portion of a side frame 62 is indicated by dot and dash lines and mounted therein is the ordinary spring plank 63 carrying truck springs 64 mounted thereon in any ordinary or preferred manner.

The bolster 56 may be of ordinary constuction in most respects but it has a reduced extension 65 at each end formed with a transverse wall or partition 66 defining a pocket 67 at the corners of which are guide ribs 68 and at the top of which is a depending guide web 69. There is also disclosed an upright reinforcing web 70 in each end portion of the bolster beneath the area where the side bearing is mounted for strengthening the structure at this point of strain.

The pocket 67 is open at its bottom and slidably mounted therein is a combined spring seat and follower 71 which may seat directly upon the springs 64 or which may engage upon a spring plate 72 interposed between it and the springs, this and kindred details being immaterial. The member 71 is shown as formed with upstanding flanges 73 and 74 which are preferably upwardly convexed, as disclosed in Figure 12, for cooperation with the similarly upwardly concaved webs or ribs 68 and 69 respectively. The top surface of the member 71, indicated at 75, is convex and the top surface 76 of the pocket 67 is concaved, ledges 77 being provided at the ends. The provision of the flange 74 divides the interior of the combined spring seat and follower into two separate compartments 78 within each of which is disposed a bank or group of leaf or plate springs 79, the center of the lowermost leaf or plate in each group bearing upon the convex bottom surface 75 and the ends of the uppermost leaf or plate bearing against the ledges 77 so that upon upward movement of the member 71 with respect to the bolster the springs will be flexed. At the bottom of the pocket are ledges 77ᵃ upon which the ends of the lowermost leaf or plate are adapted to engage when in unflexed condition.

For maintaining the parts in assembled relation and preventing displacement during shipment or handling, pins 80 may be provided which pass through the outer end wall of the bolster and through the wall 66 and which extend into elongated slots 81 in the flanges 73.

An important feature of this form of the invention is the provision of means whereby the leaf or plate springs may be introduced within their proper compartments so as to be supported upon the ledges 77ᵃ. In carrying out this feature each outer end wall is shown as formed with an elongated slot 82 through which the plates or leaves may be individually inserted and distributed within the compartments 78. It will be observed that when the member 71 is in proper assembled relation and forced partly into the bolster with the plate or leaf springs under a certain initial compression the flange 73 at the outermost or farthest side or end of the member 71 will cover the slot so that any possible slipping out of a plate or leaf will be avoided. The guide webs or ribs 68 and 69 will of course operate to maintain the plates or leaves in each bank or group in the proper assembled relation so that they will always occupy the same relative positions in action.

In the operation of all the forms of the device above described, it will be apparent that when a load is applied to the truck bolster by the body bolster, either at the center bearing or the side bearings, depending upon the type of truck bolster, the plate or leaf springs within the ends of the bolster will be flexed, the degree of flexure depending upon the load. In all instances the upper surface of the combined spring seat and follower is represented as convex and the opposed surface within the bolster concaved to permit the flexing of the springs under strain. It is preferable that the coacting flanges on the combined spring seat and follower and within the pocket should engage just prior to the time when the auxiliary plate or leaf springs go solid so as to relieve them of any excessive strain which might be caused by an overload. As the auxiliary springs within the bolster are of the plate or leaf type and as the truck springs are ordinarily of helical type their period of oscillation or deflection is different and if for any reason the plate or leaf springs should be used for supporting the bolster instead of helical springs it is still intended that the period or deflection of oscillation of both should be different, the difference in periodicity breaking up or preventing synchronization so that car roll or side sway will be prevented. Obviously, the spring capacity is increased as the resilience of the auxiliary springs is added to that of the truck springs and heavier loads may therefore be carried without undue strain on the parts.

Figure 16:
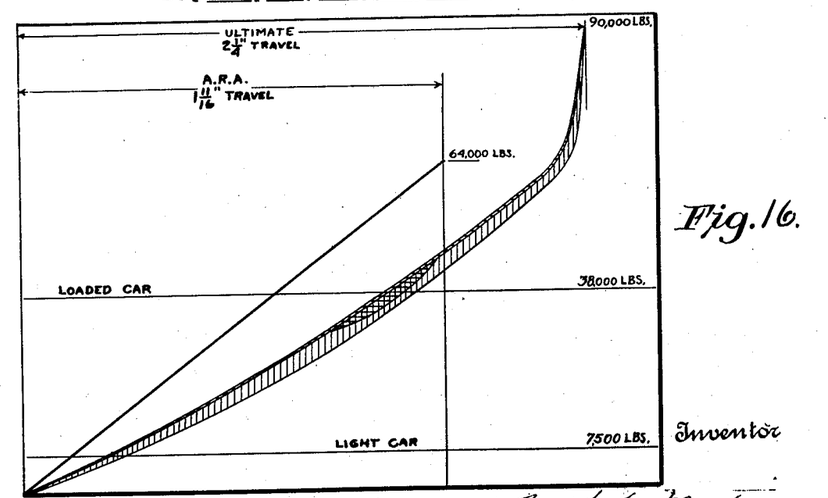
Figure 16 is a diagram showing the curve under different load conditions.

The efficiency of the arrangement is particularly well illustrated in Figure 16 which is a diagrammatic view showing the action of the springs under light and loaded car conditions.

Figure 17:
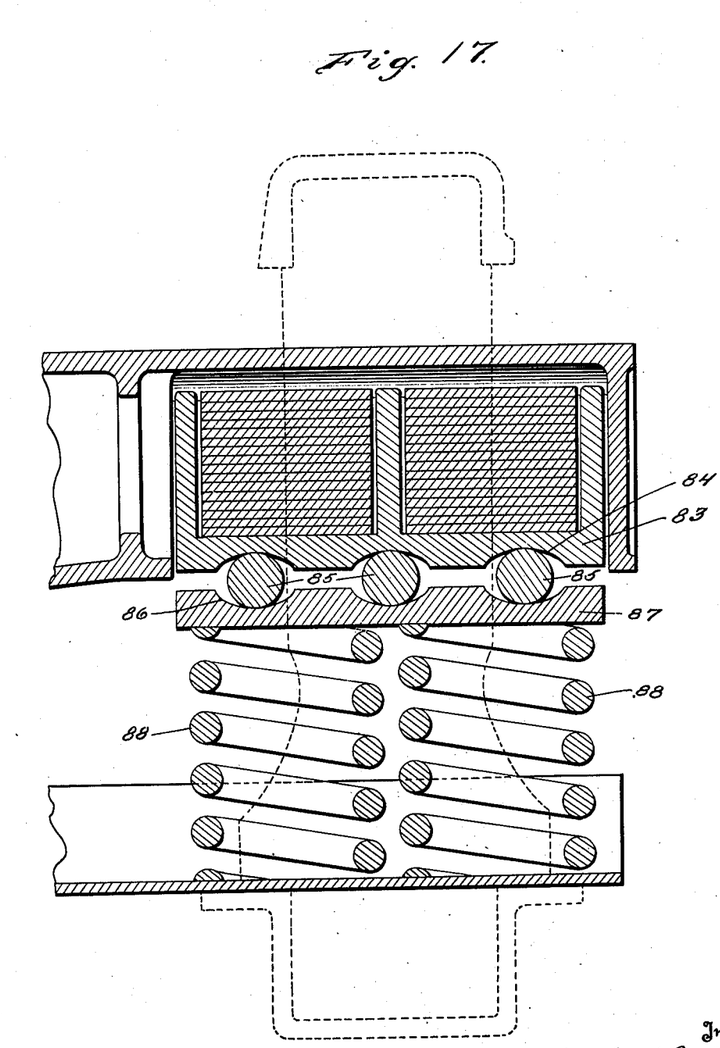
Figure 17 is a vertical longitudinal section through one end portion of a bolster equipped with the invention and provided with lateral motion permitting means.

The invention is further capable of being employed in connection with a bolster of such construction that lateral motion is permitted and this modification is illustrated in Figure 17 in which the same arrangement is disclosed as above described except that use is made of a member 83 corresponding to the combined spring seats and followers 71, 45 and 12 of the above described forms, this member 83 being provided with any desired number of depressions or concavities 84 in its underside for the accommodation of rollers or rockers 85 which, in turn, seat within similar depressions or concavities 86 in a spring plate 87 carried by the truck springs 88 and mounted stationarily with respect thereto by any desired means. This form operates in exactly the same manner as the above described forms with the added feature that the bolster is capable of lateral movement with respect to the side frames as the concavities and rollers will permit the action.

From the foregoing description and a study of the drawings it will be apparent that I have thus provided a simple, inexpensive and easily assembled and installed absorption mechanism for the bolsters of railway trucks and which will efficiently operate to perform all the functions for which it is intended, all the objects of the invention being achieved in a manner which should be well understood by one skilled in the art without further explanation.

While I have shown and described several preferred embodiments of the invention, it should be understood that the entire disclosure is merely illustrative of the principles involved as the right is reserved to make all such changes in the details of the structure as well as the arrangement and combination of parts as will increase the adaptability and widen the field of utility, provided such variations constitute no departure from the spirit of the invention or the scope of the claims hereunto appended.

Having thus described the invention, I claim:

1. In a railway truck bolster, a pocket formed in each end thereof open at its bottom, a combined spring seat and follower mounted for vertical sliding movement within each pocket and adapted to seat upon the truck springs, and a series of superposed plate springs mounted within the pocket and engaging upon said combined spring seat and follower, the top of the combined spring seat and follower and the top surface of the pocket being correspondingly curved to permit flexure of the springs under compression.

2. In a railway truck bolster, a pocket formed in each end thereof open at its bottom, a combined spring seat and follower mounted for vertical sliding movement within each pocket and adapted to seat upon the truck springs, and a series of superposed plate springs mounted within the pocket and engaging upon said combined spring seat and follower, the top of the combined spring seat and follower and the top surface of the pocket being correspondingly curved to permit flexure of the springs under compression, the bolster being provided within each pocket with vertical guide ribs adjacent the corners of the spring plates.

3. In a railway truck bolster, a pocket formed in each end thereof open at its bottom, a combined spring seat and follower mounted for vertical sliding movement within each pocket and adapted to seat upon the truck springs, and a series of superposed plate springs mounted within the pocket and engaging upon said combined spring seat and follower, the top of the combined spring seat and follower and the top surface of the pocket being correspondingly curved to permit flexure of the springs under compression, the bolster being provided within each pocket with depending flanges and the combined spring seat and follower having upstanding flanges corresponding to and adapted to interfittingly engage the first named flanges upon maximum compression of the springs.

4. In a railway truck bolster, a pocket formed in each end thereof open at its bottom, a combined spring seat and follower mounted for vertical sliding movement within each pocket and adapted to seat upon the truck springs, and a series of superposed plate springs mounted within the pocket and engaging upon said combined spring seat and follower, the top of the combined spring seat and follower and the top surface of the pocket being correspondingly curved to permit flexure of the springs under compression, and means engaging the bolster and the combined spring seat and follower for limiting relative separating movement thereof.

5. In a railway truck bolster, a pocket formed in each end thereof open at its bottom, a combined spring seat and follower mounted for vertical sliding movement within each pocket and adapted to seat upon the truck springs, and a series of superposed plate springs mounted within the pocket and engaging upon said combined spring seat and follower, the top of the combined spring seat and follower and the top surface of the pocket being correspondingly curved to permit flexure of the springs under compression, and means engaging the bolster and the combined spring seat and follower for limiting relative separating movement thereof, comprising stop elements extending horizontally into each pocket, the combined spring seat and follower having slots receiving said stop elements.

6. A railway truck bolster having each end portion formed with a transverse wall in spaced relation to the closed outer end to define a pocket at each end, the pocket being open at the bottom, a combined spring seat and follower mounted for vertical sliding movement within each pocket, the follower being provided with a plurality of spaced upstanding flanges and having a curved upper surface, the top wall of the pocket having a correspondingly curved surface, and a series of superposed plate springs located between and in engagement with the top of the combined spring seat and follower and the top wall of the pocket and confined between said flanges.

7. A railway truck bolster having each end provided with a pocket open at the bottom, a vertically movable combined spring seat and follower slidable within each pocket and adapted to seat upon the truck springs, said combined spring seat and follower being provided with a plurality of spaced upstanding flanges cooperating with the walls of the pocket to act as guides and further acting to define compartments, a bank of superposed plate springs mounted within each compartment, the top surface of the combined spring seat and follower and the top surface of the pocket being correspondingly curved to permit flexure of the plate springs under compression.

8. A railway truck bolster having each end provided with a pocket open at the bottom, a vertically movable combined spring seat and follower slidable within each pocket and adapted to seat upon the truck springs, said combined spring seat and follower being provided with a plurality of spaced upstanding flanges cooperating with the walls of the pocket to act as guides and further acting to define compartments, a bank of superposed plate springs mounted within each compartment, the top surface of the combined spring seat and follower and the top surface of the pocket being correspondingly curved to permit flexure of the plate springs under compression, the flanges being convex, and the pocket having therein depending concaved flanges normally spaced from and corresponding to the first named flanges and engageable thereby to serve as stops.

9. A railway truck bolster having each end provided with a pocket open at the bottom, a vertically movable combined spring seat and follower slidable within each pocket and adapted to seat upon the truck springs, said combined spring seat and follower being provided with a plurality of spaced upstanding flanges cooperating with the walls of the pocket to act as guides and further acting to define compartments, a bank of superposed plate springs mounted within each compartment, the top surface of the combined spring seat and follower and the top surface of the pocket being correspondingly curved to permit flexure of the plate springs under compression, each outer end wall of the bolster having a slot therein permitting introduction of the spring plates.

10. A railway truck bolster provided at each end with internally arranged auxiliary cushioning means, means engaging said means for placing the same under compression, a seat member adapted to be engaged upon the truck springs, and means interposed between said seat member and said second named means for permitting lateral motion of the bolster.

11. A railway truck bolster provided at each end with internally arranged auxiliary cushioning means, means engaging said means for placing the same under compression, a seat member adapted to be engaged upon the truck springs, and means interposed between said seat member and said second named means for permitting lateral motion of the bolster, comprising a plurality of rollers, the underside of said second named means and the top of said seat member being formed with seats accommodating the rollers.

12. In a railway truck bolster, a pocket in each end thereof substantially fully open at its bottom, a combined unitary spring seat and follower mounted for substantially vertical bodily movement within each pocket and adapted to seat upon the truck springs, a bank of superposed plate springs located within the pocket, the top of said combined seat and follower being convex and the underside of the top of the bolster pocket being concave whereby to permit upward flexure of the springs at their centers under compression.

13. A railway truck bolster having each end substantially fully open at the underside, a combined unitary spring seat and follower arranged for substantially vertical bodily movement within each open end and adapted to seat upon the truck springs, a bank of superposed plate springs located within each open end and engaged by the top of the combined seat and follower, the underside of the top of the bolster and the top of said seat and follower being shaped to permit upward flexing of the springs under compression, and guide means within the bolster for preventing displacement of the seat and follower and plate springs longitudinally of the bolster.

14. A truck bolster provided at the bottom of each end portion with a substantially rectangular opening, a follower vertically bodily movably mounted within the opening and adapted to seat upon the truck springs, a bank of superposed plate springs located in the end portion of the bolster, retaining ledges at the bottom of the bolster engaged beneath the bank of springs at the ends thereof, said follower having a convex upper surface engaging beneath the bank of springs, and the underside of the top of the bolster being upwardly recessed to permit upward flexure of the springs upon the application of pressure thereto by the follower.

15. A truck bolster provided at the bottom of each end portion with an opening, a follower vertically movably mounted within the opening, a bank of superposed plate springs above and engaged by each follower and adapted to be flexed upwardly upon compression, retaining means extending beneath the plate springs for limiting downward movement thereof, and means for limiting downward movement of the follower.

16. A truck bolster provided in its bottom at each end with an opening, a vertically movable follower mounted within the opening and adapted to seat upon the truck springs, a bank of superposed plate springs above and in engagement with the follower and adapted to be flexed upwardly under compression, means for limiting downward movement of the springs, means for limiting downward movement of the follower, and cooperating means on the bolster and follower for limiting upward movement of the latter to prevent over-flexure of the springs.

17. A truck bolster provided in its bottom at each end with an opening, a vertically movable follower mounted within the opening and adapted to seat upon the truck springs, a bank of superposed plate springs above and in engagement with the follower and adapted to be flexed upwardly under compression, means for limiting downward movement of the springs, means for limiting downward movement of the follower, and cooperating means on the bolster and follower for limiting upward movement of the latter to prevent over-flexure of the springs, said last named means constituting projections on the follower and abutment portions formed within the bolster.

18. A truck bolster provided at the bottom of each end with an opening, a vertically movable unitary follower within the opening adapted to seat upon the truck springs, cushioning means located between the follower and the top of the bolster and acting always in series with the truck springs, and coacting elements on the follower and bolster and within the latter adapted for abutting engagement to limit upward movement of the follower and over-compression of the cushioning means.

19. A truck bolster provided in its bottom with an opening at each end, a follower mounted for vertical movement within the opening and adapted to seat upon the truck springs, cushioning means interposed between the follower and the top of the bolster, removable means extending into the bolster for limiting downward movement of the follower and springs and preventing displacement prior to installation in a truck.

20. A truck bolster provided at its bottom with an opening at each end, a vertically movable follower mounted within the opening and adapted to seat upon the truck springs, cushioning means interposed between the follower and the top of the bolster, means for preventing downward displacement of the cushioning means, separate means for limiting downward movement of the follower, and separate means limiting upward movement of the follower.

21. A railway truck bolster provided with an opening in its bottom at each end, a vertically movable follower mounted within the opening and adapted to seat upon the truck springs, and a bank of superposed plate springs engaged between the follower and the top of the bolster and adapted to be flexed under compression, a wall of the bolster having a slot therein through which the spring plates may be introduced during assembly.

22. A truck bolster provided with an opening in its bottom at each end, a vertically movable follower within each opening, cushioning means interposed between the follower and the top of the bolster and acting in series with the truck springs, and lateral motion permitting means interposed between the follower and the truck springs.

23. A railway truck bolster provided with an opening in its bottom at each end, a vertically movable follower mounted within the opening and adapted to seat upon the truck springs, a bank of superposed plate springs engaged between the follower and the top of the bolster and adapted to be flexed under compression, a wall of the bolster having an opening therein through which the plate springs may be introduced during assembly.

24. A railway truck bolster provided with an opening in its bottom at each end, a vertically movable follower mounted within the opening and adapted to seat upon the truck springs, a bank of superposed plate springs engaged between the follower and the top of the bolster and adapted to be flexed under compression, a wall of the bolster having an opening therein through which the plate springs may be introduced during assembly, and means on the follower adapted to cover said opening.

25. A railway truck bolster provided with an opening in its bottom at each end, a vertically movable follower mounted within the opening and adapted to seat upon the truck springs, a bank of superposed plate springs engaged between the follower and the top of the bolster and adapted to be flexed under compression, a wall of the bolster having an opening therein through which the plate springs may be introduced during assembly, the follower having a flange thereon normally covering the opening when the parts are assembled.

In testimony whereof I affix my signature.

MARK H. MARTIN.